United States Patent
Kobayashi et al.

(10) Patent No.: US 7,903,522 B2
(45) Date of Patent: *Mar. 8, 2011

(54) MASTERING DEVICE, DISC MANUFACTURING METHOD, DISC-SHAPED RECORDING MEDIUM, DISC REPRODUCTION DEVICE, AND DISC REPRODUCTION METHOD

(75) Inventors: Seiji Kobayashi, Kanagawa (JP); Jin Pan, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/512,613

(22) Filed: Jul. 30, 2009

(65) Prior Publication Data

US 2009/0285058 A1    Nov. 19, 2009

Related U.S. Application Data

(63) Continuation of application No. 11/764,418, filed on Jun. 18, 2007, now Pat. No. 7,596,075, which is a continuation of application No. 10/504,322, filed as application No. PCT/JP03/16868 on Dec. 26, 2003, now Pat. No. 7,248,558.

(30) Foreign Application Priority Data

Jan. 6, 2003 (JP) ................... 2003-000341

(51) Int. Cl.
*G11B 7/24* (2006.01)
(52) U.S. Cl. .................. 369/59.25; 369/59.12
(58) Field of Classification Search .............. 369/275.1, 369/275.3, 275.4, 59.13, 53.34, 285, 44.41, 369/59.11, 59.17, 59.25, 47.27, 44.28
See application file for complete search history.

(56) References Cited

U.S. PATENT DOCUMENTS

| 6,219,322 B1 | 4/2001 | Kobayashi |
| 6,735,160 B1 | 5/2004 | Miyashita et al. |
| 7,248,558 B2 | 7/2007 | Kobayashi et al. |
| 7,596,075 B2 * | 9/2009 | Kobayashi et al. ........ 369/275.4 |

FOREIGN PATENT DOCUMENTS

| JP | 7-272282 | 10/1995 |
| JP | 9-246979 | 9/1997 |
| JP | 10-134515 | 5/1998 |
| JP | 11-66739 | 3/1999 |
| JP | 2000-195049 | 7/2000 |
| JP | 2000-242929 | 9/2000 |
| JP | 2001-52446 | 2/2001 |
| JP | 2001-319334 | 11/2001 |
| JP | 2001-357533 | 12/2001 |
| JP | 2002-8231 | 1/2002 |
| JP | 2002-197671 | 7/2002 |

* cited by examiner

*Primary Examiner* — Ali Neyzari
(74) *Attorney, Agent, or Firm* — Oblon, Spivak, McClelland, Maier & Neustadt, L.L.P.

(57) ABSTRACT

Second digital information serving as copyright protection information can be stably and reliably read without any effect of a defect or pit missing on a disk-shaped recording medium. Second digital information is recorded onto a disk-shaped recording medium by wobbling a pit sequence recorded as a first signal. The second digital information is recorded so that a plurality of bits constituting the second digital information are allocated in a unit period of an identical sync signal contained in the first signal. During playback, the plurality of bits constituting the recorded second digital information are read a plurality of times every unit period of the sync signal, and information of the read bits is then integrated. Thus, information from a large number of wobbled pits across unit periods of a plurality of sync signals can be integrated to determine the bit values.

6 Claims, 10 Drawing Sheets

FIG. 4

| SYNC NUMBER | 24-BIT SYNC BODY<br>9T　　9T | 6-BIT SYNC ID |
|---|---|---|
| FS0 | #01 010 000 000 010 000 000 010 | 000 001 |
| FS1 | #01 010 000 000 010 000 000 010 | 010 010 |
| FS2 | #01 010 000 000 010 000 000 010 | 101 000 |
| FS3 | #01 010 000 000 010 000 000 010 | 100 001 |
| FS4 | #01 010 000 000 010 000 000 010 | 000 100 |
| FS5 | #01 010 000 000 010 000 000 010 | 001 001 |

FIG. 5A

| 2640 CLOCKS |
|---|

| FS0 | DATA (220-BYTE = 1760-BIT) |
|---|---|

←|165|→

PN: 0, 1, 2, 3, 4, 5, 6, 7, 8, 9, 10, 11, 12, 13, 14, 15

SLTC: B0A, B0B, B1A, B1B, B2A, B2B, B3A, B3B, B4A, B4B, B5A, B5B, B6A, B6B, B7A, B7B

FIG. 5B

| 2640 CLOCKS |
|---|

| FS1 | DATA (220-BYTE = 1760-BIT) |
|---|---|

PN: 0, 1, 2, 3, 4, 5, 6, 7, 8, 9, 10, 11, 12, 13, 14, 15

SLTC: B8A, B8B, B9A, B9B, B10A, B10B, B11A, B11B, B12A, B12B, B13A, B13B, B14A, B14B, B15A, B15B

FIG. 5C

| 2640 CLOCKS |
|---|

| FS2 | DATA (220-BYTE = 1760-BIT) |
|---|---|

PN: 0, 1, 2, 3, 4, 5, 6, 7, 8, 9, 10, 11, 12, 13, 14, 15

SLTC: B16A, B16B, B17A, B17B, B18A, B18B, B19A, B19B, B20A, B20B, B21A, B21B, B22A, B22B, B23A, B23B

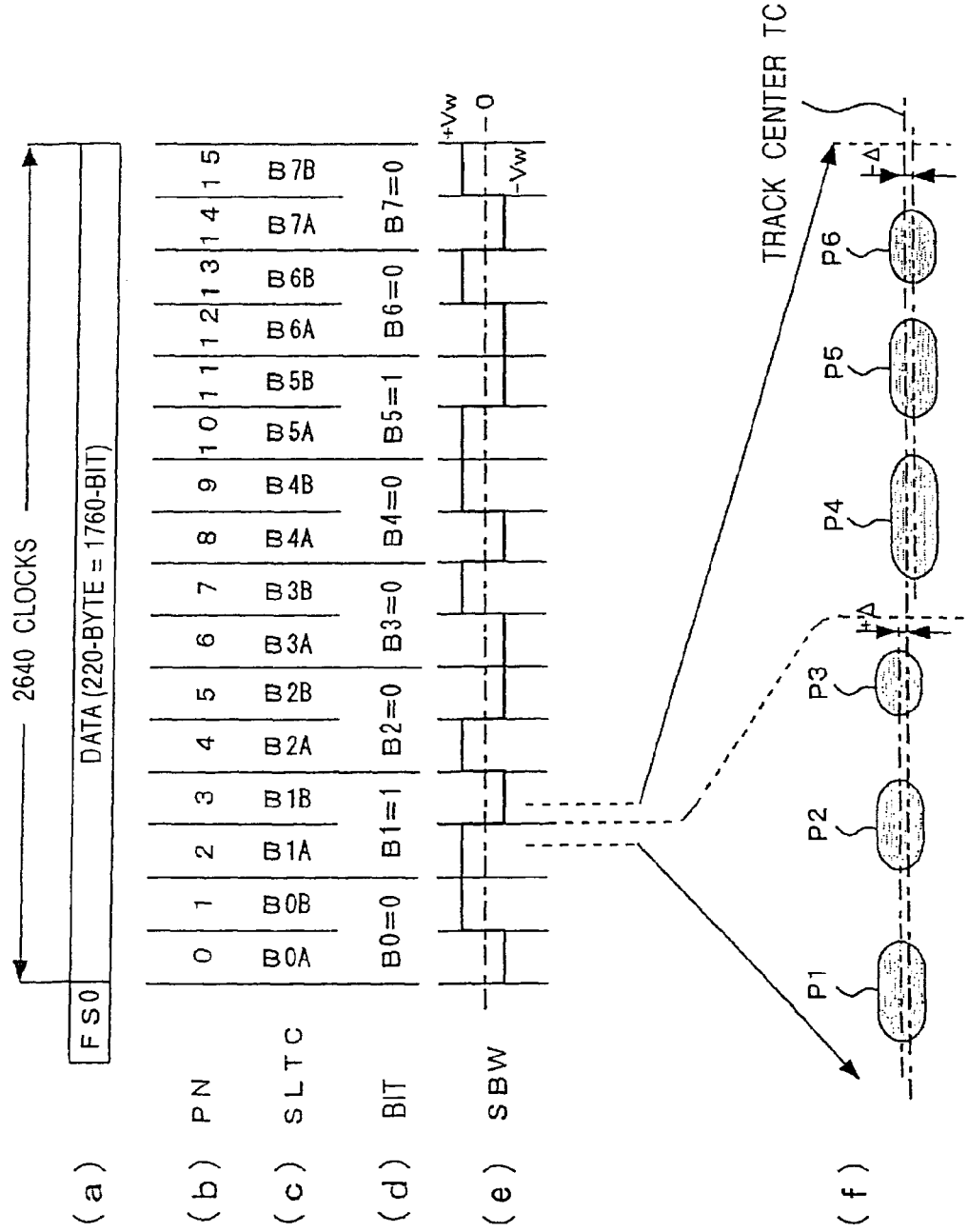

FIG. 8

| | | VALUE OF PN | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| VALUE OF FN | FS0 | B0A | B0B | B1A | B1B | B2A | B2B | B3A | B3B | B4A | B4B | B5A | B5B | B6A | B6B | B7A | B7B |
| | FS1 | B8A | B8B | B9A | B9B | B10A | B10B | B11A | B11B | B12A | B12B | B13A | B13B | B14A | B14B | B15A | B15B |
| | FS2 | B16A | B16B | B17A | B17B | B18A | B18B | B19A | B19B | B20A | B20B | B21A | B21B | B22A | B22B | B23A | B23B |
| | FS3 | B24A | B24B | B25A | B25B | B26A | B26B | B27A | B27B | B28A | B28B | B29A | B29B | B30A | B30B | B31A | B31B |
| | FS4 | B32A | B32B | B33A | B33B | B34A | B34B | B35A | B35B | B36A | B36B | B37A | B37B | B38A | B38B | B39A | B39B |
| | FS5 | B40A | B40B | B41A | B41B | B42A | B42B | B43A | B43B | B44A | B44B | B45A | B45B | B46A | B46B | B47A | B47B |

MASTERING DEVICE, DISC MANUFACTURING METHOD, DISC-SHAPED RECORDING MEDIUM, DISC REPRODUCTION DEVICE, AND DISC REPRODUCTION METHOD

CROSS-REFERENCE TO RELATED APPLICATIONS

This application is a Continuation of and claims the benefit of priority from U.S. Ser. No. 11/764,418, filed Jun. 18, 2007, which is a continuation of U.S. Ser. No. 10/504,322, filed Aug. 24, 2004, (now U.S. Pat. No. 7,248,558),which is the national stage of PCT/JP03/16868, filed Dec. 26, 2003 and claims the benefit of priority under 35 U.S.C. §119 from Japanese Patent Application No. 2003-000341, filed Jan. 6, 2003. The entire contents of the above applications are incorporated herein by reference.

TECHNICAL FIELD

The present invention relates to a mastering apparatus for mastering a disk-shaped recording medium such as a CD (Compact Disc) or a DVD (Digital Versatile Disc), and to a disk manufacturing method for manufacturing a disk-shaped recording medium such as a CD or a DVD by such mastering. The present invention further relates to a disk-shaped recording medium such as a CD or a DVD, and to a disk playback apparatus that plays back a disk-shaped recording medium.

BACKGROUND ART

In typical compact disks (CDs), a region referred to as an IFPI (International Federation of the Phonographic Industry) code is recorded in an area further towards the center than the area in which signals used by a user, such as an audio signal and a TOC (Table Of Contents), are recorded. This code is imprinted with markings of vendors, manufacturing plants, disk numbers, etc., for the purpose of preventing illegal copies called pirated copies.

The recorded markings of vendors, manufacturing plants, disk numbers, etc., are visually recognizable. In playing back a CD or the like, such markings are not readable on a playback apparatus.

That is, the content of such an IFPI code cannot be reflected in operation control of the playback apparatus. Moreover, as described above, since the content can be visually confirmed, the IFPI code has a problem in that the code itself can be copied with ease.

Recordable optical disks onto which a user is able to readily duplicate CDs, DVDs, etc., have also been commercially available. For example, the use of commercially available CD-R disks and apparatuses allows digital information recorded in a CD to be copied exactly by a simple operation. Such copies can be copied with violating copyright, protected under the copyright law, and another problem occurs in that the copyright owner can get no fair reward.

In order to overcome the foregoing problems, in the related art, assuming that information used by a user, such as an audio signal, is set as first information, second information serving as information for copyright protection or the like is superimposed and recorded on the first information.

In the related art, for example, there has been proposed an optical disk in which a plurality of specific pit sequences, each being configured so that a portion of multiple information pits is arranged so that the center line thereof is displaced in the radial direction, are arranged on an information track in units of data blocks of a recording signal at certain intervals in an intermittent manner.

Another example has been proposed, i.e., an optical disk equipped with an illegal copy preventing function, in which, in a portion of a specific radial area of the disk, the information pit sequences are displaced in the radial direction of the track from the center line of the information pit sequence across the track length where a signal variation detectable in a tracking error signal band occurs (see, e.g., Japanese Unexamined Patent Application Publication No. 9-81938).

Furthermore, in the related art, there has been proposed an optical recording carrier in which first information serving as main information and second information relating to control information for playing back the first information are recorded, wherein third information that is different from the first and second information is recorded in association with the second information such that when the first information is played back based on the second information, the third information is not directly contained in the decoded first information (see Japanese Unexamined Patent Application Publication No. 11-66739).

Furthermore, in the related art, there has been proposed a data recording medium in which first data is recorded by repeating pits and lands for a duration equal to an integer multiple of the duration corresponding to a predetermined basic period, wherein second data is recorded by displacing the pits in the direction perpendicular to the track direction from the center of the track and the displacement is within a predetermined amount as long as an off-track situation does not occur (see Japanese Unexamined Patent Application Publication No. 2000-242929).

Furthermore, in the related art, there has been proposed an optical recording medium in which a recording track is formed of continuous lands or grooves and pits are formed on the recording track based on main data, thereby recording the main data, wherein the pits formed on the recording track a predetermined distance apart are displaced by a predetermined amount in the direction orthogonal to the center line of the recording track in the track direction based on additional data, thereby recording the additional data (see Japanese Unexamined Patent Application Publication No. 2002-197671).

In this publication, claim 5 recites that the amount of displacement ranges from 20 nm to 100 nm.

According to the above-noted publications of the related art, second information is recorded by laterally displacing (wobbling) pits. Such information recording by wobbles is only feasible on a mastering apparatus that irradiates light onto a master optical disk. It is therefore impossible to record information recorded by wobbles onto a recordable apparatus such as a CD-R. The wobbled information is recorded onto a master disk, and the presence of the information is checked during playback. Thus, illegal disks copied by a recordable apparatus such as a CD-R can be eliminated.

However, the publications of the related art have a problem in that a sufficient amount of wobbling is required to ensure that information recorded by the wobbles is detected. This is because the signal for detecting the wobbles has a poor signal-to-noise ratio (SNR).

For example, in Japanese Unexamined Patent Application Publication No. 2002-197671 of the related art, the wobble amount ranges from 20 nm to 100 nm, and it is necessary to manufacture a disk with a relatively large amount of wobble. Such large displacement can cause wobbles to be observed and confirmed using an electron microscope or the like.

Therefore, a problem occurs in that the content of the wobbles can be analyzed, and the risk of illegal copying increases.

In general, one conceivable technique to overcome a low SNR is to extend the wobbled area, i.e., a pit sequence, and to remove noise using a low-pass filter. However, an actual optical disk playback apparatus is designed so that a tracking servo is used to adjust the position of a light spot to the center of a wobble. If the wobbled area is extended, the amplitude of a wobble detection signal is gradually lowered according to movement of the spot, and the wobble detection signal has substantially no amplitude at the position where the movement of the light spot is completed.

In view of such functionality of the tracking servo, it is not effective to merely extend the wobbled area. This is because a large wobble amplitude is required in the related art.

The present applicant has proposed an improvement, that is, an optical disk onto which main data is recorded according to the length and pitch of pits along a track and sub-data is recorded by displacing the pits in the inner and outer radial directions with respect to the center of the track, wherein the pits are displaced according to a result of computation of the sub-data and a predetermined binary sequence (see Japanese Unexamined Patent Application Publication No. 2000-195049).

In this optical disk, information recorded by wobbles is detected by integral detection using a predetermined binary sequence. In this invention, one bit of copyright protection information is allocated to one frame of a CD for recording. One frame is a disk length equal to 12 mm. A playback signal for such a long period is detected by integration, thus allowing a wobble recorded with a relatively small amplitude to be sufficiently detected.

This publication of the related art can thus greatly reduce the amount of pit wobble. While overcoming the previously described drawbacks with the related art, practical copyright protection is therefore achievable.

For example, if a defect occurs at the beginning of a frame during playback of an optical disk, a clock variation phenomenon (bit slip) can occur.

In Patent Document 5, if a bit slip occurs, as described above, the clock becomes out of phase, and the binary sequence used in recording is not reproduced and correct data decoding is thus impossible. The bit slip is not overcome until the next sync pattern has been played back. Therefore, if a defect occurs at the beginning of a frame and a bit slip occurs, it is impossible to play back the bit of the data, which is troublesome.

In a case where no error correcting code is added to the sub-information, namely, copyright protection information, if a read error of one bit occurs, a serious problem occurs in that the data must be played back from the beginning.

DISCLOSURE OF INVENTION

In order to overcome the problems described above, it is an object of the present invention to sufficiently reduce the amount of wobble modulation required for recording copyright protection information for preventing illegal copies of CDs, DVDs, etc., by wobbling, and to ensure that such information is read.

Accordingly, in the present invention, a mastering apparatus that records first digital information by irradiating a laser beam onto a master disk to record a pit sequence and that further records second digital information by wobbling the pit sequence has the following structure:

The mastering apparatus includes first signal generating means for generating a first signal by modulating the first digital information according to a required format, bit selecting means for, according to a relative position from a sync signal contained in the first signal, allocating a plurality of bits constituting the second digital information in a unit period of the same sync signal, and wobble modulating means for wobbling the pit sequence in both positive and negative directions according to an output of the bit selecting means.

Furthermore, in the present invention, a disk manufacturing method for manufacturing a disk-shaped recording medium by mastering in which first digital information is recorded by irradiating a laser beam onto a master disk to record a pit sequence and second digital information is further recorded by wobbling the pit sequence is performed as follows:

The disk manufacturing method includes a first signal generating step of generating a first signal by modulating the first digital information according to a required format, a bit selecting step of, according to a relative position from sync information contained in the first signal, allocating a plurality of bits constituting the second digital information in a unit period of the same sync signal, and a wobble modulating step of wobbling the pit sequence in both positive and negative directions according to an output of the bit selecting means.

Furthermore, in the present invention, a disk-shaped recording medium in which a first signal generated by modulating first digital information according to a required format is recorded with a length and pitch of pits and in which second digital information is further recorded by displacing the position of the pits in the direction orthogonal to the longitudinal direction of a track is configured as follows:

According to a relative position from a sync signal contained in the first signal, a plurality of bits constituting the second digital information are allocated in the same sync signal period, and the pit position is displaced in both positive and negative directions according to the allocated bits.

Furthermore, in the present invention, a disk playback apparatus has the following structure:

The disk playback apparatus includes first reading means for obtaining a first signal that is recorded onto a disk-shaped recording medium with a length and pitch of pits by modulating first digital information according to a required format, second reading means for reading second digital information that is recorded so as to be superimposed on the first signal by wobbling the pits, a plurality of signal integrating means for integrating the second digital information read by the second reading means according to a relative position from a sync signal contained in the first signal read by the first reading means, and determining means for determining an output of the plurality of signal integrating means to decode a plurality of bits of the second digital information in a unit period of each sync signal serving as the second digital information.

Furthermore, in the present invention, a disk playback method is performed as follows:

The disk playback method includes a first reading step of obtaining a first signal that is recorded onto a disk-shaped recording medium with a length and pitch of pits by modulating first digital information according to a required format, a second reading step of reading second digital information that is recorded so as to be superimposed on the first signal by wobbling the pits, a plurality of signal integrating steps of integrating the second digital information read in the second reading step according to a relative position from a sync signal contained in the first signal read in the first reading step; and a determining step of determining an output of the plurality of signal integrating steps to decode a plurality of bits of the second digital information in a unit period of each sync signal serving as the second digital information.

According to the present invention, second digital information is recorded onto the disk-shaped recording medium by wobbling a pit sequence recorded as the first signal, and a plurality of bits constituting the second digital information are allocated and recorded in a unit period of an identical sync signal contained in the first signal. Thus, the plurality of bits constituting the second digital information are allocated and recorded periodically in a unit period of the same sync signal.

For example, during playback, the plurality of periodically recorded bits constituting the second digital information are read a plurality of times every unit period of a sync signal, and information of the read bits is then integrated.

The information from a large number of wobbled pits across unit periods of a plurality of sync signals can thus be integrated to determine the bit values. Therefore, the second digital information can be stably and reliably read without any effect of a defect or failure on the disk-shaped recording medium.

BRIEF DESCRIPTION OF THE DRAWINGS

FIG. 4 is an illustration of an example structure of sync patterns inserted in the modulated signal.

FIGS. 5A, 5B, and 5C are illustrations for showing transition of the value of a select signal SLCT for designating selection of an analog switch 28 shown in FIG. 2.

FIG. 7 is a schematic diagram of an operation for recording second information SB based on a wobble command signal SBW.

FIG. 8 is an illustration of the structure of a reference information 24a stored in a reference table 24 shown in FIG. 2.

BEST MODE FOR CARRYING OUT THE INVENTION

An embodiment of the present invention will now be described.

A disk-shaped recording medium in this example is implemented as, for example, a disk, such as a disk, e.g., a CD or a DVD, or a recently developed high-density disk (Blu-ray disk).

More specifically, the disk-shaped recording medium is an optical disk having a diameter of 12 cm, and, for example, data only for playback is recorded with embossed pits of about λ/4 in depth onto such a disk under the condition of combining laser having a wavelength of 405 nm (so-called blue laser) and an objective lens having an NA of 0.85. The data is recorded and played back with a track pitch of 0.32 pm and a linear density of 0.12 μm/bit.

A process for manufacturing such a disk is roughly divided into a so-called mastering process and disk forming process (replication process). The mastering process is a process for producing a metal master (stamper) to be used in the disk forming process, and the disk forming process is a process for mass-producing duplicated optical disks using the stamper.

More specifically, in the mastering process, a polished glass substrate is coated with a photoresist, and a laser beam is irradiated onto this photosensitive film to form pits or wobbles. That is, so-called mastering is conducted.

After the mastering and, then, a predetermined operation such as development, information is transferred onto the metal surface by, for example, electroforming to create a stamper necessary for replicating the disk.

Then, the stamper is used to transfer information onto a resin substrate by, for example, injection, and to form a reflection film over the transferred information on the resin substrate. Then, a necessary operation, such as processing into a disk form, is performed to create a final product.

Figure 1:
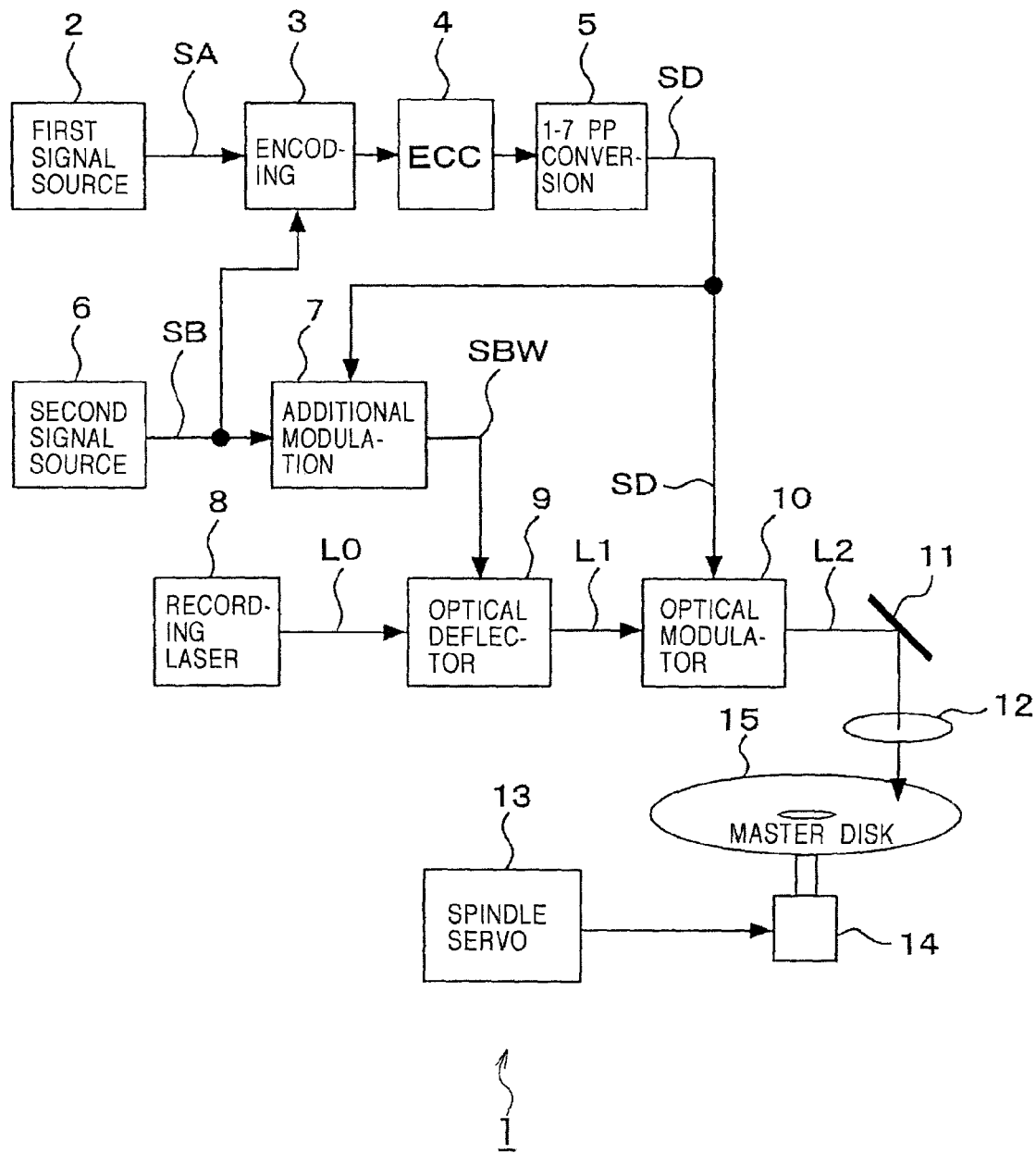
FIG. 1 is a block diagram showing an example of the internal structure of a mastering apparatus according to an embodiment of the present invention.

FIG. 1 is a block diagram showing an example of the internal structure of a mastering apparatus 1 according to this embodiment that performs the mastering process in the disk manufacturing process described above.

In FIG. 1, first, a master disk 15 is driven and rotated by a spindle motor 14. The spindle motor 14 whose rotation is controlled by a spindle servo circuit 13 is controlled so as to be driven at a rotational speed suitable for the rotation control method employed.

Digital information to be recorded onto the master disk 15, such as music and/or video, is supplied as first information SA from a first signal source 2.

Other than the first information SA, in this embodiment, second information SB, which is information for preventing illegal copies called pirated copies, is supplied from a second signal source 6.

The second information SB is digital information including, for example, ID information unique to each master disk 15, manufacturing-plant-related information, date of manufacture, information for copy-permitted/copy-prohibited control, and so on.

In this embodiment, the first information SA is encoded using the second information SB as key information by an encoding circuit 3 described below for recording. Thus, the second information SB is used to prevent illegal copies.

In this embodiment, for ease of illustration, in the following description, the second information SB is composed of 32-bit data, by way of example. However, actually, the number of bits may increase to increase the decoding complexity in order to make it more difficult to create illegal copies.

The encoding circuit 3 encodes the first information SA supplied from the first signal source 2 using, as key information, the 32-bit data supplied as the second information SB from the second signal source 6. In this case, any encoding technique, such as DES (Data Encryption Standard), may be used.

An ECC (Error Correcting Code) circuit 4 adds an error correcting code to the output of the encoding circuit 3, and interleaves the data to which the error correcting code is added. This ensures that the data is played back if a defect or failure occurs on a disk created based on the master disk 15.

A 1-7 PP converting circuit 5 modulates the input data from the ECC circuit 4 according to the RLL (1,7) PP modulation method (RLL: Run Length Limited/Parity preserve Prohibit rmtr (repeated minimum transition run-length)).

The 1-7 PP converting circuit 5 generates a pit modulation signal SD whose level 1 and level 0 change for a period equal to an integer multiple of a predetermined period. In the pit modulation signal SD, a DC component is suppressed, and sync patterns are inserted periodically.

An additional modulating circuit 7 detects the sync patterns from the RLL (1-7) PP modulated pit modulation signal SD to synchronize the detected patterns, and converts the second information SB into a wobble command signal SBW having both positive and negative polarities. As shown in FIG. 1, the resulting wobble command signal SBW is output to an optical deflector 9.

The internal structure of the additional modulating circuit 7 is described below.

A recording laser 8 is formed of, for example, a gas laser, and emits a laser beam LO to the optical deflector (AOD) 9.

The optical deflector 9 includes an acoustic optical deflector, and so on, and changes the traveling direction of the laser beam LO emitted from the recording laser 8 according to the wobble command signal SBW supplied from the additional modulating circuit 7 to emit a laser beam L1.

An optical modulator 10 includes an acoustic optical modulator, and so on, and turns on/off the laser beam Li at high speed according to the level of the pit modulation signal SD supplied from the 1-7 PP converting circuit 5 to output a laser beam L2.

The laser beam L2 is bent by a mirror 11 at an angle so as to be irradiated onto a recording surface of the master disk 15, and is focused onto the recording surface of the master disk 15 through an objective lens 12.

The mirror 11 and the objective lens 12 are sequentially moved by a sled mechanism (not shown) in the direction of the disk radius in synchronization with rotation of the master disk 15.

The focus position of the laser beam L2 is sequentially displaced towards, for example, the outer circumference of the master disk 15, and a track (pit sequence) is formed in a spiral manner on the master disk 15.

The length and pitch of the pit sequence are defined according to the pit modulation signal SD. The position of the pits (wobbles) is displaced in the direction orthogonal to the track according to the wobble command signal SBW.

As described above, the master disk 15 that is irradiated with light by the mastering apparatus 1 in the manner described above is developed and plated to create a stamper. Then, information is transferred onto a resin substrate using the stamper, and a reflection film is formed on the transferred information on the resin substrate. Then, a necessary operation, such as processing into a disk form, is performed to create a disk 100 according to this embodiment.

Figure 2:
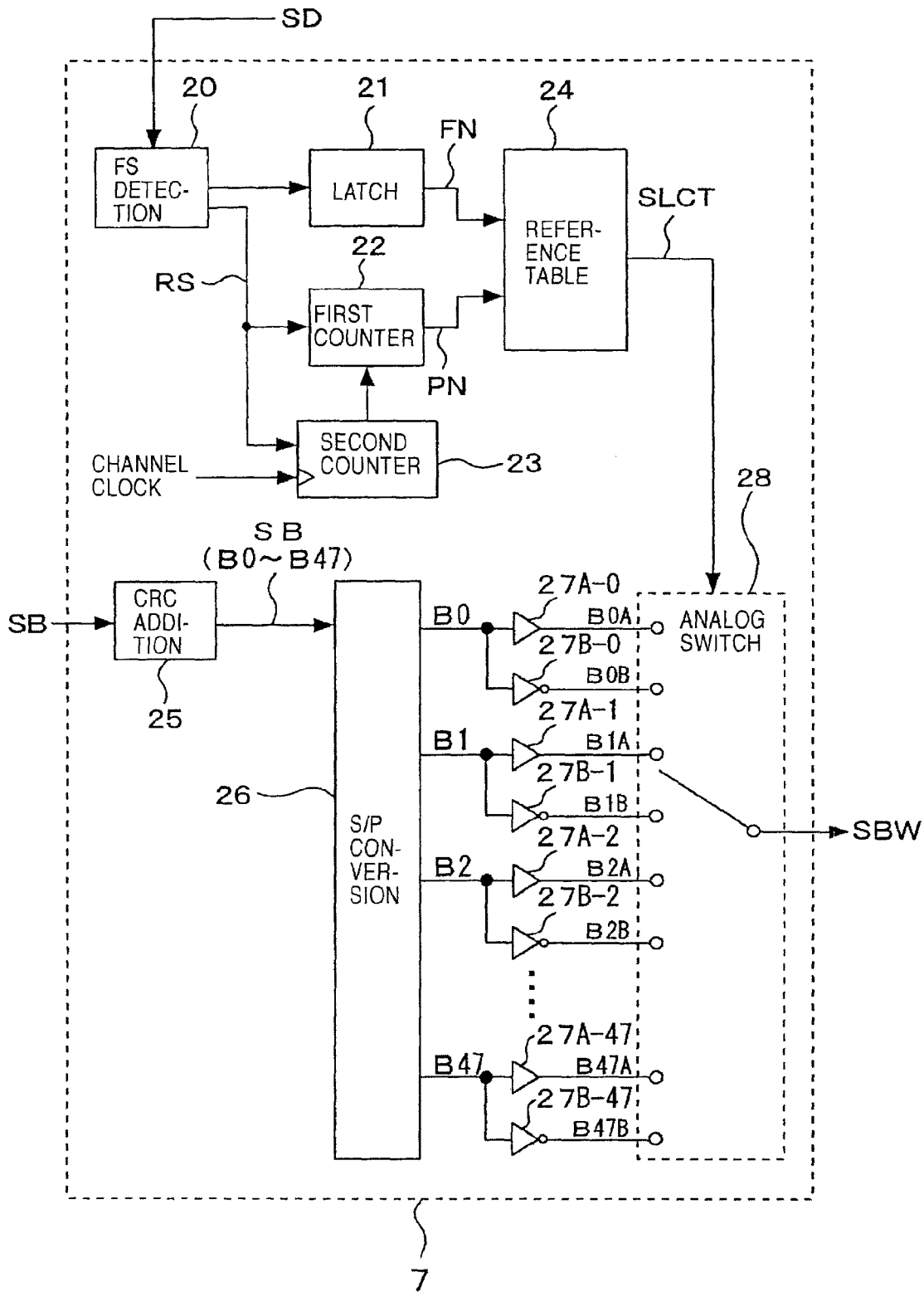
FIG. 2 is a block diagram showing an example of the internal structure of an additional modulating circuit 7 disposed in the mastering apparatus of the embodiment.

FIG. 2 shows an example of the internal structure of the additional modulating circuit 7.

In FIG. 2, a pit modulation signal SD is the signal that is output from the 1-7 PP converting circuit 5 shown in FIG. 1. As shown in FIG. 2, the pit modulation signal SD is input to a sync pattern (FS) detecting circuit 20 in the additional modulating circuit 7.

Thus, the sync pattern detecting circuit 20 receives the first information SA that has been subjected to RLL (1-7) PP modulation.

Figure 3:
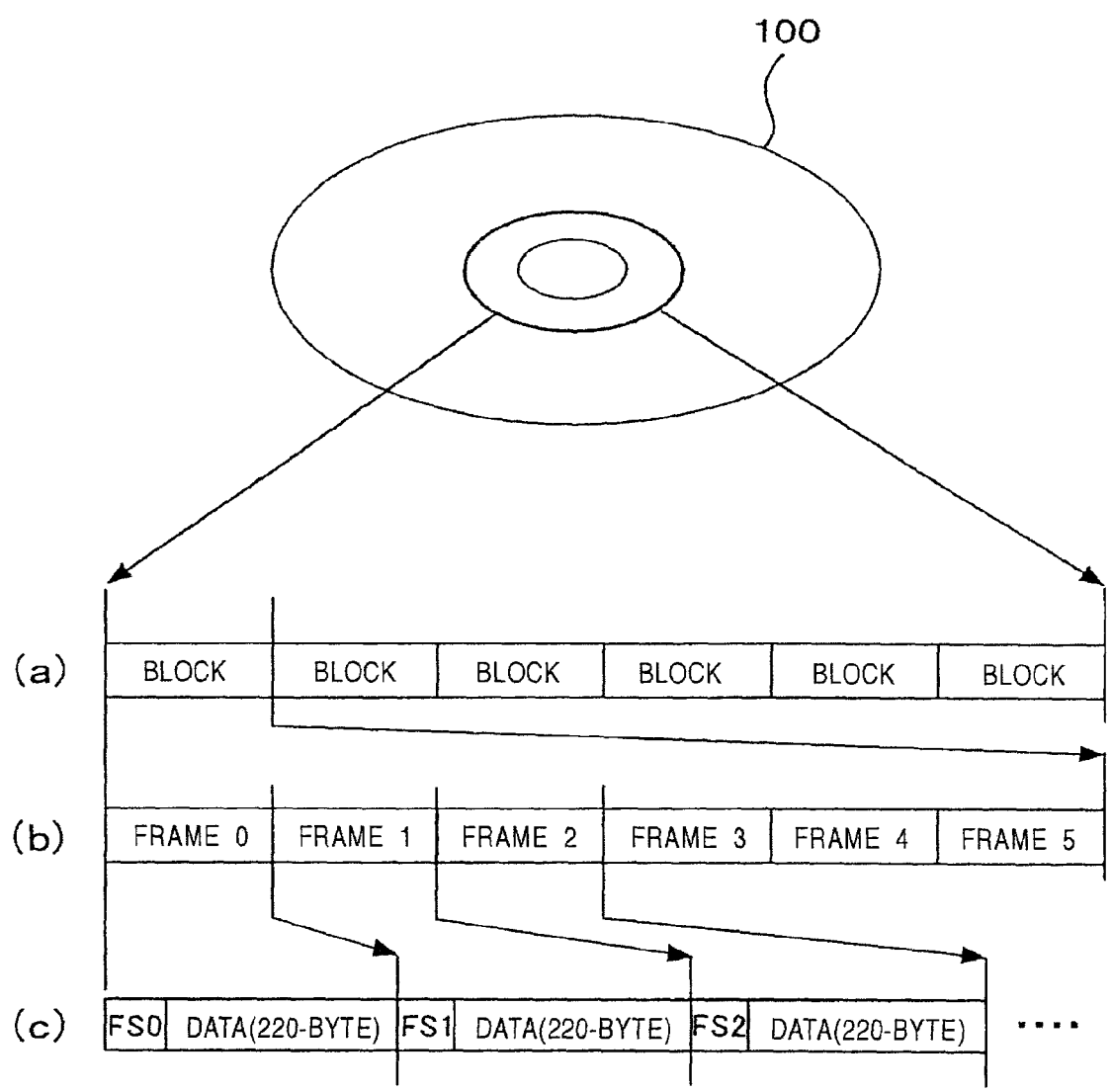
FIG. 3 is a schematic diagram showing the structure of a signal modulated using the RLL (1-7) PP modulation method.
Figure 6A:
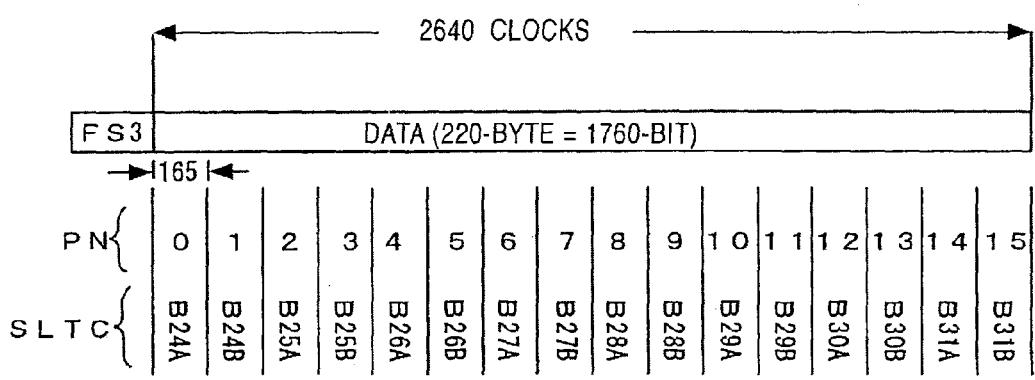
FIGS. 6A, 6B, and 6C are also illustrations for showing transition of the value of the select signal SLCT for designating selection of the analog switch 28 shown in FIG. 2.
Figure 6B:
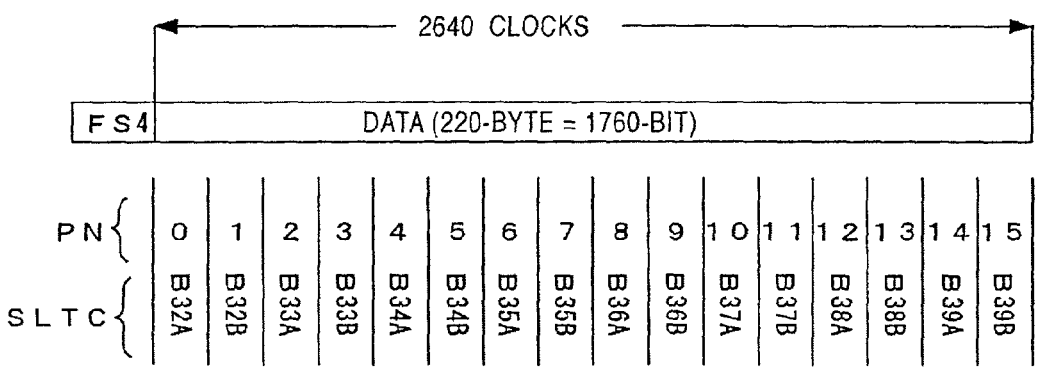
Figure 6C:
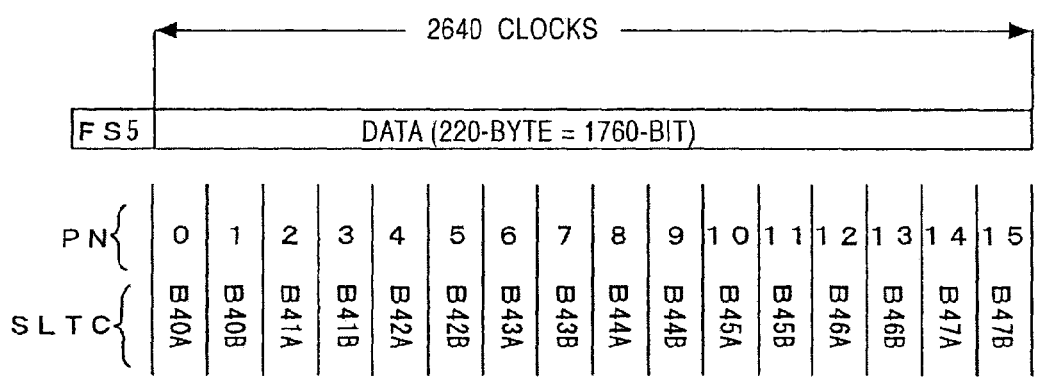

The signal to be recorded onto the master disk 15 (i.e., the disk 100) after RLL (1-7) PP modulation has a structure shown in, for example, FIG. 3.

FIG. 3 is a diagram schematically showing the structure of a signal to be recorded onto the disk 100 (i.e., the master disk 15) according to this embodiment.

As shown in FIG. 3, a pit sequence is spirally or concentrically recorded onto the disk 100.

The pit sequence to be recorded is segmented in units called blocks having a predetermined length, as shown in FIG. 3(*a*). Each block has an error correcting code and address information, and is a minimum unit by which the data is independently readable.

As shown in FIG. 3(*b*), each block is divided into six frames referred to as "Frame 0" to "Frame 5". As shown in FIG. 3(*c*), different sync patterns are added to the beginning of the respective frames, and the frame number is determined by the type of the sync pattern. As also shown in FIG. 3(*c*), 220-byte data resides after each sync pattern.

Each sync pattern employs, for example, a pattern having a length of 30 bits, as described in Japanese Unexamined Patent Application Publication No. 2000-68846.

As shown in FIG. 4, for example, different sync patterns are used for the six different frames (i.e., FS0 to FS5 in FIG. 4). In the example shown in FIG. 4, the first 24 bits of the 30 bits constituting each sync pattern are allocated a fixed pattern referred to as a sync body. The bit indicated by "#" in FIG. 4 is determined according to the value of the previous bit, and a fixed pattern in which inversion represented by "010" is followed by 9T-9T inversion intervals is subsequently allocated. This allows for sync detection.

A unique 6-bit sync ID is further allocated to each frame. The sync IDs can be used to identify the frames FS0 to FS5.

In FIG. 2, the sync pattern detecting circuit 20 detects the six sync patterns (FS0 to FS5) contained in the pit modulation signal SD, and holds these patterns in a latch 21 as frame number information FN.

The sync pattern detecting circuit 20 also activates a reset pulse RS when a sync pattern is detected, and resets the count of a first counter 22 and a second counter 23. Thus, the count value of the first counter 22 and the second counter 23 is reset to "0" after a sync pattern has been detected, and the value is incremented.

The second counter 23 starts from count value "0", increments the value in units of channel clocks, and resets the count value to "0" when the count value reaches a predetermined value. In this case, the predetermined value is set to "164", and the second counter 23 is therefore a 165-ary counter.

The first counter 22 counts up by one each time the count value of the second counter 23 overflows and returns to "0".

Therefore, an output PN of the first counter 22 is reset to "0" immediately after a sync pattern, and is then incremented by one every 165 clocks.

A reference table 24 includes a memory device such as a ROM (Read Only Memory). The ROM of the reference table 24 stores the frame number information FN supplied from the latch 21, and reference information 42*a* for outputting a predetermined select signal SLCT according to the value of the output PN of the first counter 22.

The reference table 24 outputs to an analog switch 28 the select signal SLCT that is output by referring to the reference information 24*a* based on the frame number information FN and the output PN.

The structure of the reference information 24*a* stored in the reference table 24 is described below.

The second information SB shown in FIG. 1 is input to a CRC (Cyclic Redundancy Check) adding circuit 25. The CRC adding circuit 25 is composed of a flip-flop, an exclusive OR, and so on, and adds a CRC code to the input second information SB.

Upon receiving the 32-bit second information SB, the CRC adding circuit 25 adds a 16-bit CRC code for error detection. The second information SB is therefore information having a total of 48 bits (B0 to B47).

The added CRC code allows error detection and elimination during reading.

The 48-bit copyright protection information (i.e., the second information SB) B0 to B47 with the CRC code being added is input to a serial-parallel (S/P) converting circuit 26, as shown in FIG. 2.

The serial-parallel converting circuit 26 is composed of a flip-flop, etc., and outputs the input 48-bit information as 48 parallel output signals bit-by-bit. The 48 output signals are branched and supplied to sets of non-inverting amplifiers 27A (0 to 47) and inverting amplifiers 27B (0 to 47).

Each of the non-inverting amplifiers 27A (0 to 47) outputs a voltage "+Vw" when the input signal has logic "1", and outputs a voltage "−Vw" when the input signal has logic "0".

Conversely, each of the inverting amplifiers 27B (0 to 47) outputs a voltage "−Vw" when the input signal has logic "1", and outputs a voltage "+Vw" when the input signal has logic "0".

Thus, each set of the non-inverting amplifier 27A and the inverting amplifier 27B is used to convert each of the input 1-bit digital signals (B0 to B47) into two analog signals (+Vw and −Vw). For example, when "B0" of the second information SB has value "1", this value is converted by the above-described operation of the non-inverting amplifier 27A-0 and the inverting amplifier 27B-0 into two analog signals, namely, "+Vw" to be output as "B0A" and "−Vw" to be output as "B0B", and these analog signals are then output.

The voltage Vw directly affects the wobble amplitude, as described below. In this embodiment, as described below, the amount of wobble displacement is set to, for example, 5 nm or less. The voltage Vw is adjusted to the level so that the amount of wobble displacement can be 5 nm or less.

The analog switch 28 selects one of the signals input from the non-inverting amplifiers 27A (0 to 47) and the inverting amplifiers 27B (0 to 47) based on the value of the select signal SLCT supplied from the reference table 24.

The selected voltage "+Vw" or "−Vw" is output as a wobble command signal SBW.

With this structure, the additional modulating circuit 7 selects one bit of the copyright protection information B0 to B47 according to the elapsed time (relative position) from the sync pattern detected by the pit modulation signal SD, as described below. A set of "+Vw" and "−Vw" corresponding to the selected bit from B0 to B47 is also output as the wobble command signal SBW.

The operation achieved in the mastering apparatus 1 having the structure described above will now be described with reference to FIGS. 5 to 8.

FIGS. 5A, 5B, 5C, 6A, 6B, and 6C are illustrations for showing transition of the value of the select signal SLCT for designating selection of the analog switch 28 shown in FIG. 2. FIGS. 5A, 5B, 5C, 6A, 6B, and 6C schematically show the frames FS0 to FS6 constituting one block shown in FIG. 4.

In this embodiment, first, as described above, 220-byte data is recorded in each frame. As shown in FIGS. 5A, 5B, 5C, 6A, 6B, and 6C, information having 220×8=1760 bits is recorded in each frame, except for the sync pattern portion.

In RLL (1-7) PP modulation, 2-bit data is converted into 3-bit data. Thus, each frame has a length of 1760×3÷2=2640 clocks.

A frame sync at the beginning of each of the frames shown in FIGS. 5A, 5B, 5C, 6A, 6B, and 6C is detected by the sync pattern detecting circuit 20 shown in FIG. 2. As described above, six different frames (FS0 to FS5) are employed in this embodiment, and the sync IDs of the detected frame syncs are determined by the sync pattern detecting circuit 20. The value of the frame number information FN determined by the sync pattern detecting circuit 20 is output from the latch 21 to the reference table 24.

When a frame sync is detected in the manner described above, a reset pulse RS is also output from the sync pattern detecting circuit 20, and the count value of the first counter 22 is reset to "0". Thus, the first counter 22 outputs the output PN having value "0" to the reference table 24.

In response to the reset pulse RS, the count value of the second counter 23 is also reset to "0". As described above, the second counter 23 starts 165-ary counting in accordance with a channel clock.

The first counter 22 increments the count value by one each time the second counter 23 counts up to the last (the channel clock changes 165 times). The value of the output PN of the first counter 22 is incremented by one every 165 clocks in the "2640" clocks corresponding to one frame. In this case, the output PN takes 16 values ranging from 0 to 15, as given by 2640÷165=16.

Upon receiving the output PN having values ranging from 0 to 15 and the frame number information FN output from the latch 21, the reference table 24 outputs a predetermined select signal SLCT based on the output PN and the frame number information FN.

The plurality of bits constituting the second information SB are then allocated to predetermined locations in a frame based on the relative time elapsed from the sync pattern detection time.

Bit allocation is shown in FIGS. 5A, 5B, 5C, 6A, 6B, and 6C, in which the 48 bits (B0 to B47) constituting the second information SB are allocated in turn to the six frames (FS0 to FS5) constituting one block.

As described above with reference to FIG. 2, each of the 48 bits is converted into two analog signals (outputs) by the non-inverting amplifier 27A and the inverting amplifier 27B. Thus, one bit is composed of two signals.

When the 48 bits are allocated in turn to the frames starting from FS0, as shown in FIG. 5A, the first 16 signals, i.e., B0A, B0B . . . B7A, and B7B, are allocated to the frame FS0. The subsequent signals to B7B, i.e., B8A, B8B . . . B15A, and B15B, are allocated to the frame FS1.

Subsequently, the signals B16A, B16B . . . B23A, and B23B are allocated to the frame FS2 shown in FIG. 5C, the signals B24A, B24B . . . B31A, and B31B are allocated to the frame FS3 shown in FIG. 6A, the signals B32A, B32B . . . B39A, and B39B are allocated to the frame FS4 shown in FIG. 6B, and the signals B40A, B40B . . . B47A, and B47B are allocated to the frame FS5 shown in FIG. 6C.

As described above with reference to FIG. 2, the reference table 24 stores the reference information 24a that helps allocate the plurality of bits constituting the second information SB to predetermined locations in each frame in the manner described above.

The reference information 24a stored in the reference table 24 has a structure shown in, for example, FIG. 8.

In FIG. 8, the reference information 24a helps allocate one of the output signals (B0A to B47A) of the non-inverting amplifiers 27A and the output signals (B0B to B47B) of the inverting amplifiers 27B in association with the frame number information FN output from the latch 21 and the output PN of the first counter 22.

In order to allocate the signals in the order shown in FIGS. 5A, 5B, 5C, 6A, 6B, and 6C, as shown in FIG. 5A, the signals B0A, B0B . . . B7A, and B7B are allocated to the values "0 to 15" of the output PN when the frame number information FN is set to "0". The subsequent signals are allocated in turn according to the value of the frame number information FN and the value of the output PN.

As shown in FIGS. 5A, 5B, 5C, 6A, 6B, and 6C, the select signal SLCT that sequentially selects B0A, B0B . . . B47A, and B47B every 165 clocks is output from the reference table 24.

Since the value of the select signal SLCT is changed, the analog signal corresponding to the value of the second information SB is output as the wobble command signal SBW output from the analog switch 28. The output analog wobble command signal SBW is input to the optical deflector 9 shown in FIG. 1, and the traveling direction of the laser beam L0 is changed according to this signal. Thus, the second information SB is recorded by wobbles onto the master disk 15.

FIG. 7 is a schematic diagram of an operation for recording the second information SB by wobbles based on the wobble command signal SBW.

FIG. 7 shows the frame number information FN having value "0", i.e., 8-bit second information SB to be recorded in the frame FS0, as shown in FIG. 7(a), by way of example.

In FIG. 7, first, for example, it is presumed that the lower bits B0 to B7 of the second information SB have values shown in FIG. 7(d). For the least significant bit "B0" having value "0", as described above with reference to FIG. 2, the non-inverting amplifier 27A-0 outputs "−Vw" and the inverting amplifier 27B-0 outputs "+Vw". Thus, the wobble command signal SBW shown in FIG. 7(e) is output such that "−Vw" is output for a first period during which "B0A" is selected as the value of the select signal SLTC shown in FIG. 7(c) and "+Vw" is output for the subsequent period during which "B0B" is selected.

For the second lowest bit "B1" having value "1", the non-inverting amplifier 27A-1 outputs "+Vw", and the inverting amplifier 27B-1 outputs "−Vw". Thus, a voltage "+Vw" is output for a period during which "B1A" is selected as the select signal SLTC, and a voltage "−Vw" is output for a period during which "B1B" is selected.

The voltage change shown in FIG. 7(e) is therefore output as the wobble command signal SBW.

As shown in FIG. 7(e), in this embodiment, the period during which the positive voltage, i.e., "+Vw", is output for each bit is equal to the period during which the negative voltage, i.e., "−Vw", is output. This is because, as described above with reference to FIG. 2, the value of one bit is always converted into two analog signals, i.e., "−Vw" and "+Vw", by each non-inverting amplifier 27A and each inverting amplifier 27B, and these analog signals are then output.

In this embodiment, therefore, the wobbling is equally performed at both positive and negative polarities. This prevents the tracking servo from changing the position of a light spot.

As described above, the wobble command signal SBW shown in FIG. 7(e) is input to the optical deflector 9 shown in FIG. 1. The optical deflector 9 changes the traveling direction of the laser light L0 according to the wobble command signal SBW. The pits to be recorded onto the recording surface of the master disk 15 are displaced in the direction orthogonal to the lengthwise direction of the track.

FIG. 7(f) schematically shows the displacement. For example, for a period during which "B1A" is selected as the select signal SLCT signal, the signal "+Vw" is output, and the pit sequence is displaced by "+Δ". That is, as shown in FIG. 7(f), for a period during which "B1A" is selected, pits P1, P2, and P3 are moved up in FIG. 7(f) by the amount of displacement "Δ" with reference to the center of the track TC.

For a period during which "B1B" is selected as the select signal SLCT, the voltage "−Vw" is output as the wobble command signal SBW, and the pit sequence is displaced by "−Δ". That is, as shown in FIG. 7(f), pits P4, P5, and P6 are moved down in FIG. 7(f) by the amount of displacement "Δ".

In this way, the pit sequence wobbled to both positive and negative polarities, thereby recording the second information SB serving as copyright protection information onto the master disk 15, i.e., the disk 100.

An optical disk playback apparatus 30 that plays back a disk 100 that is manufactured by the mastering apparatus 1 described above and that has the first information SA and the second information SB superimposed and recorded thereon will now be described with reference to FIGS. 9 to 10.

Figure 9:
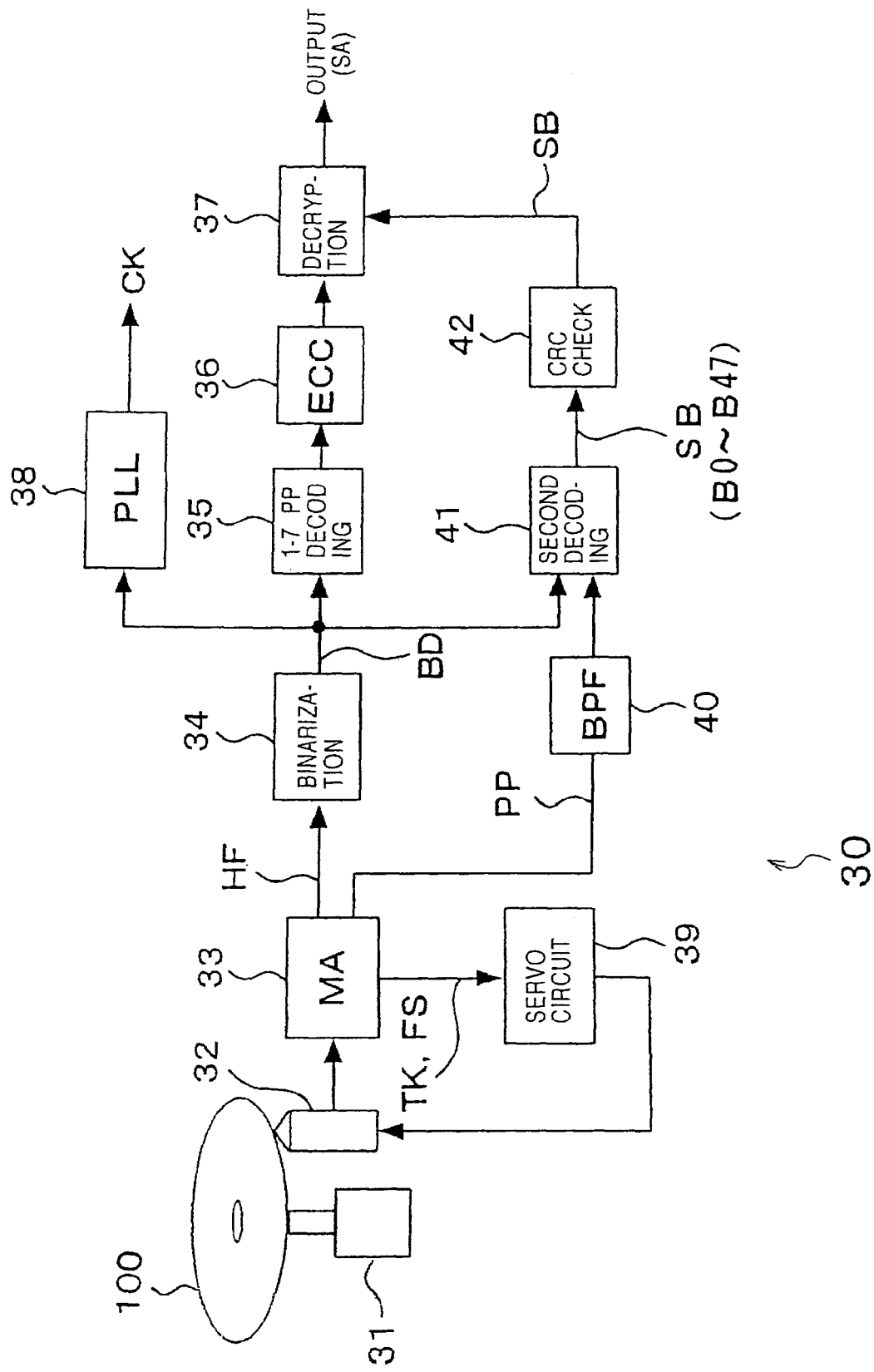
FIG. 9 is a block diagram showing an example of the internal structure of a disk playback apparatus according to an embodiment of the present invention.

FIG. 9 is a block diagram showing an example of the internal structure of the optical disk playback apparatus 30 that is an embodiment of the disk playback apparatus according to the present invention.

In FIG. 9, a disk 100 is a disk-shaped recording medium that is manufactured by the mastering apparatus 1. As is understood from the foregoing description, first information SA and second information SB serving as copyright protection information, which is formed by wobbling a pit sequence indicating the first information SA, are recorded onto the disk 100.

The disk 100 is rotated by a spindle motor 31. The spindle motor 31 and an optical pickup 32 are controlled by a servo circuit 39 so as to perform a predetermined operation.

The optical pickup 32 converts the light beam reflected by the disk 100 into electrical signals using a plurality of detectors, and then outputs the signals. A matrix amplifier (MA) 33 performs matrix operation on the plurality of electrical signals detected by the optical pickup 32 to generate and output a track error signal TK, a focus error signal FS, a push-pull signal PP, and a playback signal HF.

The track error signal TK and the focus error signal FS are supplied to the servo circuit 39, and are used for controlling the focal point of the optical pickup 32, etc. The playback signal HF is supplied to a binarizing circuit 34, and is used as the pit modulation signal SD to detect the information recorded on the disk 100.

The push-pull signal PP is supplied to a band-pass filter (BPF) 40 where undesired low-frequency and high-frequency noise components are removed, and the result is supplied to a second decoding circuit 41. The second decoding circuit 41 reads the second information SB recorded by wobbles onto the disk 100 based on the push-pull signal PP. The internal structure of the second decoding circuit 41 is described below.

The binarizing circuit 34 binarizes the supplied playback signal HF, and generates a binary signal BD. The binary signal BD is supplied to a 1-7 PP decoding circuit 35, a PLL circuit 38, and the second decoding circuit 35.

The 1-7 PP decoding circuit 35 performs inverse operation of RLL (1-7) PP modulation to decode the recorded information, and supplies the result to an ECC circuit 36.

The ECC circuit 36 corrects an error based on the ECC (Error Correcting Code) added in the encoding process during recording.

The PLL circuit 38 generates a channel clock CK based on the supplied binary signal BD. The generated channel clock CK is supplied to the components shown in FIG. 9, and is used as an operation clock.

A CRC checking circuit 42 receives the 48-bit second information SB read by the second decoding circuit 41, and checks an error based on the code that is added to the second information SB by the CRC adding circuit 25 described above with reference to FIG. 1.

In the CRC checking circuit 42, if it is determined that the second information SB is correctly read as a result of the error check, the first 32 bits of the 48 bits (B0 to B47), which represent copyright protection information, except for the CRC code (16-bit), are sent to a decrypting circuit 37.

The decrypting circuit 37 cancels the encoding that is applied using the second information SB during recording to decode the first information SA, and plays back and output the decoded information SA.

Thus, the first information SA that has been encoded using the second information SB, i.e., copyright protection information, as the key is decoded and is played back in a standard manner.

In the CRC checking circuit 42, if it is determined that an error is contained as a result of the error check, it is impossible to correctly decrypt the encoded first information SA. In this case, for example, a system controller (not shown) may be notified of this, the system controller may control the components of the optical disk playback apparatus 30 to reset the system, and the copyright protection information B0 to B47 may be detected again.

Figure 10:
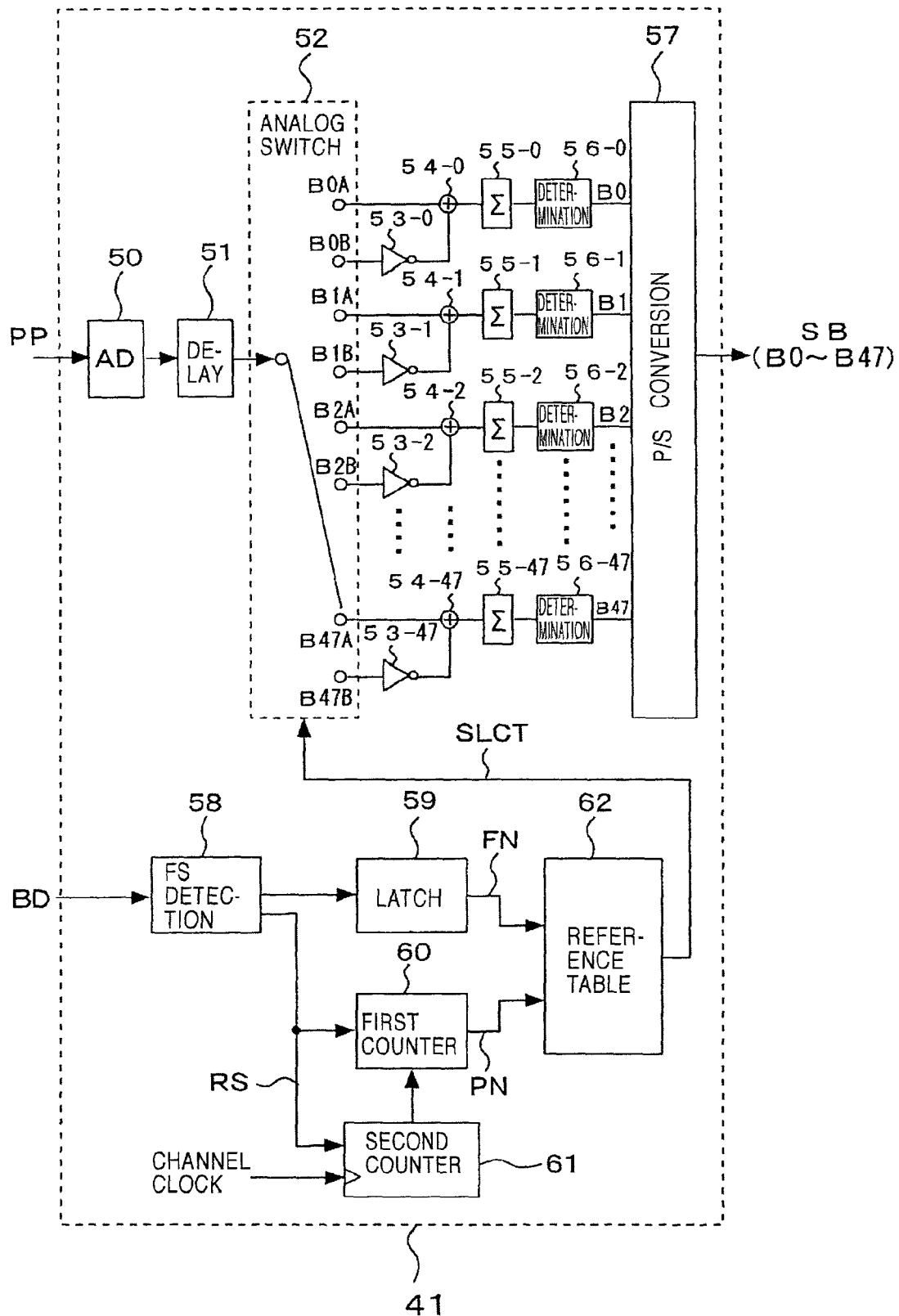
FIG. 10 is a block diagram showing an example of the internal structure of a second decoding circuit 41 disposed in the disk playback apparatus according to the embodiment.

FIG. 10 is a block diagram showing an example of the internal structure of the second decoding circuit 41 for decoding the second information SB shown in FIG. 9.

In FIG. 10, the push-pull signal PP supplied from the band-pass filter 40 shown in FIG. 9 is input to an AD converter 50, and is converted into a digital signal. The digital signal is delayed by a delay circuit 51 by a predetermined time, and is synchronized with the binary signal BD.

The binary signal BD shown in FIG. 9 is input to a sync pattern (FS) detecting circuit 58. The sync pattern detecting circuit 58 performs a similar operation to that of the sync pattern detecting circuit 20 shown in FIG. 2.

Specifically, the sync pattern detecting circuit 58 detects the six sync patterns (FS0 to FS5) contained in the RLL (1-7) PP modulated binary signal BD, and holds these patterns in a latch 59 as frame number information FN. The sync pattern detecting circuit 58 further activates the reset pulse RS in the manner described above when a sync pattern is detected, and resets the count value of a first counter 60 and a second counter 61.

Also in this case, the first counter 60 and the second counter 61 are reset to "0" immediately after a sync pattern, and increment the value.

The first counter 60 and the second counter 61 perform a similar operation to that shown in FIG. 2. That is, the second counter 61 is a 165-ary counter, and the first counter 60 increments the count value by one each time the count value of the second counter 61 is reset to "0".

A reference table 62 also performs a similar operation to that shown in FIG. 2. Specifically, the reference table 62 outputs as a select signal SLCT a value that is predetermined in association with the frame number information FN and the output PN of the first counter 60.

Also in this case, the select signal SLCT is input to an analog switch 52. Thus, one of the signals B0A, B0B . . . B47A, and B47B input to the analog switch 52 is selected at an equivalent timing to that for recording described above with reference to FIGS. 5 to 6.

Also in this case, reference information stored in the reference table 62 is equivalent to the reference information 24a shown in FIG. 8.

Thus, for example, when the area in which the "B0A" terminal of the analog switch 28 shown in FIG. 2 is selected during recording is played back, the output of the push-pull signal PP from the delay circuit 51 appears at the "B0A" terminal of the analog switch 52.

Likewise, for example, the push-pull signal PP that is obtained by playing back the area in which "B0B" is selected and recorded during recording appears at the "B0B" terminal of the analog switch 52.

Thus, in the analog switch 52, the 48 bits, each being converted into two analog signals during recording, are obtained based on the push-pull signal PP input from the delay circuit 51.

Inverting devices 53-0 to 53-47 are connected to the B0B to B47B terminals of the analog switch 52, respectively, and output signals with the polarity inverted.

For example, when the least significant bit of the second information SB input as the push-pull signal PP is "0", referring back to FIG. 7, the signals that are wobbled by "−Δ" and "+Δ" are obtained at the "B0A" and "B0B" terminals of the analog switch 52, respectively. Due to the above-described operation of the inverting device 53, the "+Δ" wobble of the "−Δ" and "+Δ" wobbles, which is obtained at the "B0B" terminal, is inverted.

With such an inverting operation, when the bit serving as the second information SB is "0", only the signal corresponding to "−Δ" is obtained. When the bit serving as the second information SB is "1", only the signal corresponding to "+Δ" is obtained.

The resulting signals are summed by summing circuits 54-0 to 54-47, and the summed signals are input to digital integrating circuits 55 (0 to 47), respectively.

Each of the digital integrating circuits 55-0 to 55-47 integrates the signal supplied from the corresponding summing circuit 54.

Each digital integrating circuit 55 integrates the inverted signal. For example, when the recorded bit has logic "0", each integrating circuit 55 integrates only the signal corresponding to the "−Δ" wobble. Then, the digital integrating circuit 55 obtains a negative value. Conversely, for example, when the bit has logic "1", a positive value is obtained.

In this embodiment, as shown in FIG. 7, wobbles are recorded with the polarity alternately changed. It is therefore expected that a noise component contained in the course of recording and playback is averaged to obtain a relatively small amplitude as a result of the above-described integrating operation of the digital integrating circuits 55.

Determining circuits 56 (0 to 47) count the number of times of integration performed in the digital integrating circuits 55, and check the polarity of the output of the corresponding digital integrating circuits 55 when the number of times of integration exceeds a predetermined value. When the output of each digital integrating circuit 55 is positive, the determining circuit 56 outputs logic "1". When the output is negative, the determining circuit 56 outputs logic "0".

The digital data (B0 to B47) output from the determining circuits 56 is supplied to a parallel-serial (P/S) converting circuit 57, and is output as the second information SB.

In this embodiment, a predetermined number of times of integration set in each determining circuit 56 is determined so that the predetermined number n is greater than 16. That is, the digital integrating circuit 55 repeats the above-described integration operation until, for example, a playback signal having the same frame number information FN has been input at least 16 times.

As previously described, in this example, the second information SB is recorded for the period of six frames (i.e., one block shown in FIG. 3). If the predetermined value n is set in the manner described above, the integration operation is repeated until the push-pull signal PP for at least 16 blocks has been input.

Since each digital integrating circuit 55 performs integration for the period of at least 16 blocks, the optical disk playback apparatus 30 of this embodiment reliably detects the second information SB that is recorded by small wobbles of 5 nm or less without any influence of noise.

In the related art, a wobble amount Δ of at least 20 nm is required. In this embodiment, in contrast, the wobble amount Δ is set to 5 nm or less. In this case, the signal-to-noise ratio (SNR) of the push-pull signal PP is also reduced to ¼ or less compared to the related art.

However, due to the random occurrence of noise, the value of the SNR increases in proportion to a square root of the number of times of integration.

In the optical disk playback apparatus 30 of this embodiment, as described above, the digital integrating circuit 55 performs integration at least 16 times, thus allowing a disk with a smaller wobble amount Δ than the related art to be reliably detected with an SNR equal to or higher than that in the related art.

In this embodiment, as shown in FIGS. 5 to 6, the second information SB is allocated and recorded in one block, and is further recorded in a plurality of blocks. Thus, the same information as the second information SB is recorded across a plurality of blocks on the disk 100.

When the second information SB recorded in this manner is played back by the optical disk playback apparatus 30, if a certain frame is not readable due to a dropout, bit slip, etc., caused by a defect on the disk, etc., the second information SB (i.e., copyright protection information) can be correctly played back although the defected portion is reflected as a slight noise level.

According to this embodiment, therefore, the second information SB can be stably and reliably read without any effect of a defect or pit missing in a recording signal on the disk 100.

Accordingly, in this embodiment, in playing back the disk 100, the second information SB recorded as wobbles is repeatedly integrated a plurality of times. Thus, the amount of wobble displacement on the disk 100 can be reduced to 5 nm or less.

As described above, the second information SB is repeatedly recorded in a plurality of blocks onto the disk 100. In playing back the second information SB, the repeatedly recorded same information is read a plurality of times, and is then integrated.

This ensures that the second information SB serving as copyright protection information is played back even if, for example, a defect or pit missing occurs at the beginning of a frame.

According to this embodiment, therefore, the second information SB can be recorded with a small amount of wobble displacement, which is equivalent to that of the related art, and the second information SB can also be reliably played back even if, for example, a defect or pit missing occurs at the beginning of a frame.

Since the second information SB recorded with a small wobble amount does not affect a recording signal, the first information SA can be copied exactly. In other words, although the encoded first information SA can be copied, the second information SB superimposed and recorded thereon for decoding the encoded first information SA is difficult to analyze and copy.

Since the second information SB is not copied to illegally copied disks, such disks cannot be played back on the optical disk playback apparatus 30. This contributes to distribution of only the authorized disks, and copyright can be more strongly protected.

In the above-described embodiment, the present invention supports the RLL (1-7) PP modulation signal method, by way of example. However, this method is merely an example, and the present invention can support substantially all modulation methods, including, for example, EFM modulation, RLL (8-16) modulation, and RLL (2-7) modulation.

Bit allocation of the second information SB to each frame in the above-described embodiment is merely an example, and any other bit allocation may be used.

In the above-described embodiment, each bit of the second information SB is alternately assigned to positive and negative signals by the non-inverting amplifier 27A and the inverting amplifier 27B. However, for example, a pseudo-random number sequence or the like may be used to assign to positive and negative polarities. In this case, the complexity of the recording signal of the second information SB further increases, thus making it more difficult to create pirated copies.

INDUSTRIAL APPLICABILITY

As described above, in the present invention, first digital information is modulated to obtain a first signal (RLL (1-7) PP modulated signal), and a pit sequence recorded as the first signal is wobbled to record second digital information onto a disk-shaped recording medium. The second digital information is recorded so that a plurality of bits constituting the second digital information are allocated to a unit period of an identical sync signal contained in the first signal. That is, the plurality of bits constituting the second digital information are allocated and recorded periodically in a unit period of an identical sync signal.

During playback, the plurality of bits constituting the second digital information, which are recorded periodically, are read a plurality of times every unit period of a sync signal, and information of the read bits is integrated.

Thus, information from a large number of wobbled pits across unit periods of a plurality of sync signals can be integrated to determine the values of the bits. Thus, the second digital information can be stably and reliably read without any effect of a defect or failure on the disk-shaped recording medium.

Moreover, according to the present invention, the values of the bits constituting the second digital signal are determined after performing integration during playback. Thus, the second digital signal can be recorded by relatively small wobbles.

Since the second digital signal can be recorded by relatively small wobbles, it is difficult to analyze the wobbles using, for example, an electron microscope. This can prevent the second digital information from being decoded with ease.

The invention claimed is:

1. A disk playback apparatus, comprising:
    first reading means for obtaining a first signal that is recorded onto a disk-shaped recording medium with a length and pitch of pits by modulating first digital information according to a required format;
    second reading means for reading second digital information that is recorded so as to be superimposed on the first signal by wobbling the pits, wherein the pits are wobbled in one of a positive direction and a negative direction during a first period and wobbled in the other direction during a second period for each of a plurality of bits constituting the second digital information;
    a plurality of signal integrating means for integrating the second digital information read by the second reading means according to a relative position from a sync signal contained in the first signal read by the first reading means, wherein each of the plurality of signal integrating means integrates each of the bits constituting the second digital information a plurality of times; and determining means for determining an output of the plurality of signal integrating means to decode the plurality of bits of the second digital information in a unit period of each sync signal serving as the second digital information.

2. The disk playback apparatus according to claim 1, wherein the plurality of signal integrating means are provided so as to correspond to the bits constituting the second digital information, respectively; and each integrating means performs integration for a period during which the sync signal is detected a plurality of times.

3. A disk playback method, comprising:

obtaining a first signal that is recorded onto a disk-shaped recording medium with a length and pitch of pits by modulating first digital information according to a required format;

reading second digital information that is recorded so as to be superimposed on the first signal by wobbling the pits, wherein the pits are wobbled in one of a positive direction and a negative direction during a first period and wobbled in the other direction during a second period for each of a plurality of bits constituting the second digital information;

a plurality of signal integrating steps of integrating the second digital information read in the second reading step according to a relative position from a sync signal contained in the first signal read in the first reading step, wherein each of the bits constituting the second digital information is integrated a plurality of times; and determining an output of the plurality of signal integrating steps to decode a plurality of bits of the second digital information in a unit period of each sync signal serving as the second digital information.

4. A disk playback apparatus, comprising:

an optical pickup and amplifier configured to obtain a first signal that is recorded onto a disk-shaped recording medium with a length and pitch of pits by modulating first digital information according to a required format, and to obtain second digital information that is recorded so as to be superimposed on the first signal by wobbling the pits, wherein the pits are wobbled in one of a positive direction and a negative direction during a first period and wobbled in the other direction during a second period for each of a plurality of bits constituting the second digital information;

a plurality of digital integrating circuits configured to integrate the second digital information according to a relative position from a sync signal contained in the first signal, wherein each of the plurality of digital integrating circuits is configured to integrate each of the bits constituting the second digital information a plurality of times; and a plurality of determining circuits configured to determine an output of the plurality of digital integrating circuits to decode the plurality of bits of the second digital information in a unit period of each sync signal serving as the second digital information.

5. A disk-shaped recording medium, comprising:

a region in which a first signal generated by modulating first digital information according to a required format is recorded with a length and pitch of pits, and in which second digital information is further recorded by displacing corresponding positions of the pits in the direction orthogonal to the longitudinal direction of a track, wherein according to a relative position from a sync signal contained in the first signal, a plurality of bits constituting the second digital information are allocated in a unit period of the same sync signal;

the pit positions are displaced in both positive and negative directions according to the allocated bits;

the pit positions are displaced in one of the positive and negative directions during a first period and the pit positions are displaced in the other direction during a second period for each of the plurality of bits constituting the second digital information; and the displaced pit positions are detected by an output of a plurality of digital integrating circuits to decode the plurality of bits of the second digital information in a unit period of each sync signal serving as the second digital information.

6. A disk manufacturing method for manufacturing a disk-shaped recording medium by mastering in which first digital information is recorded by irradiating a laser beam onto a master disk to record a pit sequence and second digital information is further recorded by wobbling the pit sequence, wherein the mastering is performed by:

generating a first signal by modulating the first digital information according to a required format;

allocating a plurality of bits constituting second digital information according to a relative position from a sync signal contained in the first signal, in a unit period of the same sync signal;

recording the generated first signal with a length and pitch of pits; and recording second digital information by displacing corresponding positions of the pits in the direction orthogonal to the longitudinal direction of a track according to an output of the allocating step, wherein the pit positions are displaced in both positive and negative directions according to the allocated bits;

the pit positions are displaced in one of the positive and negative directions during a first period and the pit positions are displaced in the other direction during a second period for each of the plurality of bits constituting the second digital information; and the displaced pit positions are detected by an output of a plurality of digital integrating circuits to decode the plurality of bits of the second digital information in a unit period of each sync signal serving as the second digital information.

* * * * *